Sept. 1, 1964 M. E. CLYNES 3,147,373
AUTO AND CROSS CORRELATION ON-LINE COMPUTER
Filed Aug. 18, 1961 2 Sheets-Sheet 1
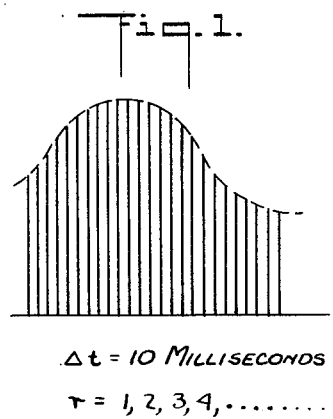
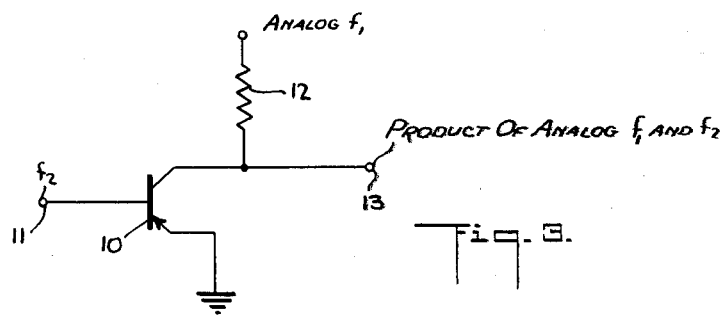
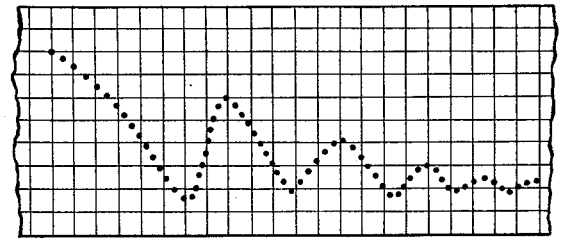
INVENTOR.
MANFRED E. CLYNES
BY Kenyon & Kenyon
ATTORNEYS

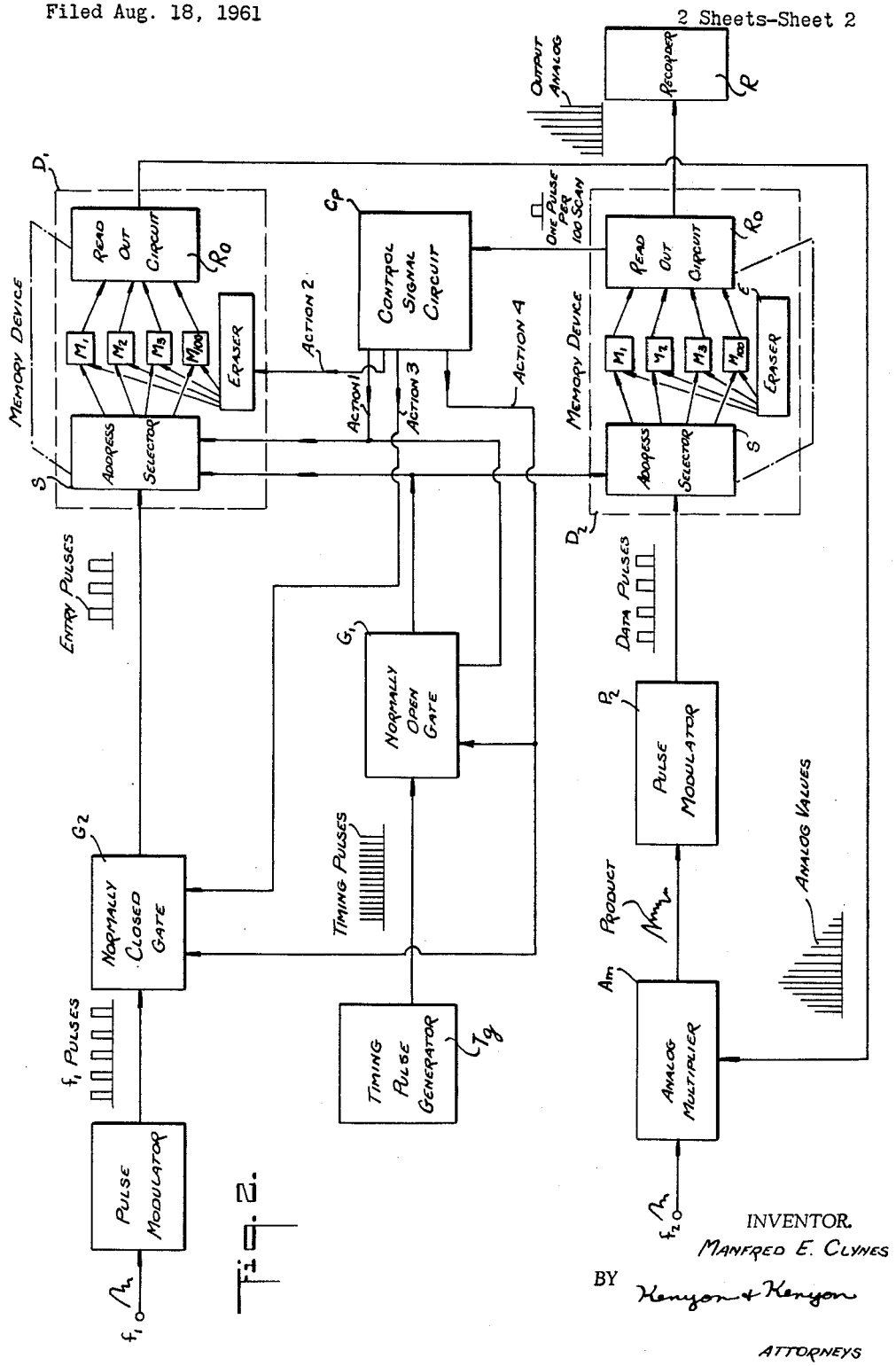

United States Patent Office 3,147,373
Patented Sept. 1, 1964

3,147,373
AUTO AND CROSS CORRELATION ON-LINE COMPUTER
Manfred E. Clynes, Orangeburg, N.Y., assignor to Mnemotron Corporation, a corporation of New York
Filed Aug. 18, 1961, Ser. No. 132,451
5 Claims. (Cl. 235—181)

The present invention relates generally to electronic computer techniques and systems, and more particularly to an auto and cross correlation on-line computer.

In many practical problems, one must give simultaneous consideration to two or more random processes. Fluctuations of information may be represented by an array of unpredictable but measureable quantities distributed in time. According to modern information theory, message and noise are random processes and must be dealt with analytically as such. Thus in a communication system, both the signal and the noise or the interference are related random phenomena. In weather forecasting, the random processes representing temperature, wind velocity, humidity and barometric pressure are in part interrelated.

Correlation techniques which indicate the dependence between two variables have proved very useful in detecting repetitive signals, such as radar pulses upon which a strong noise signal is superimposed. Using cross correlation methods, one may extract the desired signal without distortion and remove the noise component.

Increasing use is also being made of auto-correlation and cross correlation techniques as a means for investigating and interpreting electrical activity in biological systems. Thus brain wave activity has been studied by the use of analog correlators including magnetic recording drums and tapes, a system for this purpose being described by Barlow in "Technical Report 300—Research Laboratory of Electronics MIT," published July 14, 1955.

The system disclosed in this report calculates the correlation function which is defined by the integral $$\phi 12(\tau) = \frac{1}{T}\int_0^T f_1(t) f_2(t+\tau) dt$$

The following operations must be carried out to solve the above equation:

(A) A delay $f_2(t)$ by a fixed time $\tau_1$
(B) A continuous formation of the products $f_1(t)$ with the delay signal $f_2(t+\tau_1)$
(C) Integration of the continuous product over the finite time interval $0 < t < T$
(D) Division by T to obtain the value of the correlation function $\phi_{12}(\tau)$ at $t=\tau_1$ The correlation function is built up by performing the calculation called for in the above equation at a sequence of values of the delay increment $\gamma\tau$. Since a correlation function consisting of one hundred or two hundred points is common in biological works, it is obvious that the repetitive operation of this system using a single interval each time is tedious, time consuming and relatively expensive in terms of personnel. Moreover, and more importantly, it is not possible to observe the correlation as it happens, but one must wait until the many computations are completed. This is obviously a serious practical drawback.

Accordingly, it is the main object of this invention to provide a technique for evaluating correlation functions and an efficient and reliable apparatus for carrying out this technique.

More specifically, it is an object of the invention to provide an on-line cross and auto correlator system adapted to analyze continuously two variables both of which or one of which is noisy, in order to determine whether there is any commonly occurring or interrelated signal in both.

Also an object of the invention is to provide a system of the above type which automatically and continuously evaluates the cross correlation function for a sufficient number of points to provide a quick and accurate record of the cross correlation function, thereby permitting the operator effectively to observe the correlation as it occurs. Thus, in tracking functions, one may cross correlate the tracking motion with the motion of the object being tracked and thereby obtain a running measure of the transfer function.

Briefly stated, these objects are accomplished by converting one of the two waves representing the random phenomena into a pulse train whose repetition rate varies as a function of wave amplitude. These pulses are directed, in successive cycles, into a first circular series of memory locations where the entering pulses are counted, the several locations being scanned during each cycle of operation to produce a series of analog voltages values representing the successive counts. With each new cycle, the count in the next location in the series is erased and the incoming pulses are entered therein, and scanning takes place beginning at the succeeding location and concluding at the location at which the pulses were newly entered. The resultant analog values are multiplied with the second wave to produce a product which is converted into a data pulse train whose repetition rate varies as the amplitude thereof. These data pulses are entered in synchronism with the scanning action in the first device into a second series of memory locations, these counts being read out as analog values to provide the desired correlation function.

For a better understanding of the invention as well as other objects and further features thereof reference is made to the following detailed description to be read in conjunction with the accompanying drawing, wherein FIG. 1 is a graph showing an example of a correlation function;
FIG. 2 is a block diagram of the system;
FIG. 3 is a schematic showing of the multiplier incorporated in the system; and
FIG. 4 is a view of the record produced by the system.

We shall assume the existence of two variables $f_1$ and $f_2$ both of which or one of which may be highly noisy. In order to determine whether there is a commonly occurring signal in both variables (either causually or epiphenomenally related), we must evaluate the cross correlation integral $$\int_0^\infty f_1(t) f_2(t+\tau) dt$$

By evaluating this integral for a sufficient number of $\tau$, we can obtain a cross correlation function as shown in FIG. 1, where each ordinate represents the value of the integral, the sequence of ordinates representing the sequence of values of $\tau$.

In accordance with the invention, a system is provided which is adapted to automatically and in continuous sequence carry out the computation for successive values of $\tau$ in a predetermined number of points to provide the desired cross correlation. While a 100 point system is disclosed, it will be obvious that the system lends itself to any desired number of points within practical limits.

The main components of the system shown in FIG. 2 are a pulse modulator $P_1$ to which signal $f_1$ is applied, the outlet of the modulator being fed through a normally closed electronic gate $G_2$ to a multiple address-pulse counter memory device $D_1$. The second signal $f_2$ is fed to an analog multiplier $A_m$ where it is combined with the output of device $D_1$, the resultant product of the multiplier being fed to a second pulse modulator $P_2$ whose output is applied to a second memory device $D_2$. The output of this device, which represents the desired correlation function, is recorded or displayed in recording device R.

We shall first describe the function of each component of the system and how the action of the components is coordinated before we describe the manner in which the computation is performed.

The pulse-frequency modulator $P_1$ is adapted to generate pulses having a repetition rate which is proportional to the varying amplitude of the signal $f_1$. In a practical embodiment of the invention, the modulator may have a carrier repetition rate of 500 kilocycles per second or higher, the rate being varied as a function of the signal. A suitable modulator for this purpose is disclosed in applicant's copending application Ser. No. 829,694, filed July 27, 1959 and Ser. No. 72,171, filed November 25, 1960, now Pat. No. 3,100,285. These modulators are constituted by an astable asymmetrical multivibrator generating carrier pulses, the applied modulation voltage causing the pulse rate to vary about the carrier frequency. It is to be understood that any known analog to digital pulse converter may be used for this purpose.

Thus the output of modulator $P_1$ consists of frequency modulated pulses of identical shape and size. The repetition rate at any instant depends on the instantaneous amplitude of the wave $f_1$.

The pulses from modulator $P_1$ are fed into memory device $D_1$ only when the normally closed gate $G_2$ is caused to open. The memory device may be in the form of commercially available instruments, such as Radiation Instrument Development Laboratory Model 34–12 "Channel Analyzer" used in the time mode only, or Radiation Counter Laboratories Inc. Multiple Channel Analyzers, Models RCL 512–256 or RCL iac 128. Also usable for the same purpose is the "Pulse Height Analyzer" model 1102 or 404 manufactured by the Technical Measurement Corporation.

These computers are all of similar design and, for purposes of illustration, we shall confine ourself to Model 34–12 which is disclosed more fully in the Operators' Manual, published in July 1960 by Radiation Instrument Development Laboratories, Inc., of Northlake, Illinois.

As shown functionally within the block $D_1$, the memory device is composed of a large number of memory locations $M_1, M_2, M_3, \ldots M_{100}$, called addresses. We shall assume that 100 such locations are provided. These memory locations appear within a magnetic core memory matrix which acts to store the incoming pulses. Counter or scaler circuits operate in conjunction with the memory locations to add the pulses stored therein. In Model 34–12 each address has a capacity of 100,000 counts and by means of the counter, the counts may be accumulated and summated. The count accumulated is stored in the counter and can be read out at any time through a read-out $R_0$ to be later described.

By means of an address selection system S, the incoming pulses are shifted or stepped from one memory address to the next. The selector is controlled by the timing pulses so that each time a timing pulse is applied, the selector directs the incoming data pulses to the next consecutive location.

The counts accumulated in the several memory channels are stored therein and may be read out at any time through read-out device $R_0$. The read-out device is essentially a digital-to-analog conversion device which converts the stored numerical value to a voltage whose magnitude is proportional thereto. The read-out device is controlled by the selector S such that when timing pulses are applied thereto, the read-out is caused to step consecutively or scan from memory channel to memory channel and thereby provide a series of analog voltages each representative of a respective sum. In device $D_1$ an eraser E is provided which is coupled to the various memory locations $M_1$ to $M_{100}$, the eraser being adapted to wipe out any selected memory location and thereby clear it for entry of a new pulse count.

The analog voltage values yielded in the read-out circuit $R_0$ are multiplied with the wave $f_2$ in analog multiplier $A_m$ and the resultant 100 points product is fed to pulse modulator $P_2$ which in practice may be identical to pulse modulator $P_1$. The data pulses generated by modulator $P_2$ have a rate which varies as a function of the amplitude of the complex wave and these pulses are applied to memory device $D_2$ which may be identical to device $D_1$. Thus the data pulses are selectively applied to one hundred memory locations and when read out are applied to recorder R. The selective stepping operation of the two memory devices are maintained in synchronism by means of a common timing pulse generator $T_g$ which applies timing pulses to the selectors S of both devices through a normally open electronic gate $G_1$. These pulses in practice may appear at 9 microsecond intervals and they act to step both the selector and the read-out whereby the shifting of the addresses and the read-out occur concurrently.

The readout values may be displayed on a cathode ray screen by applying the voltages to one set of deflection elements, a timing base or sweep voltage being concurrently applied to the other set of deflection elements to provide a cathode ray display in which the analog values are presented in rectangular coordinates. The display may of course be photographed to provide a record, as shown in FIG. 4, where the series of points form the correlation curve.

A similar display in permanent form may be made by means of a strip chart pen recorder coupled to the read-out device or an X-Y plotter, wherein the 100 numbers corresponding to the addresses of the memory are read out in the form of closely spaced points on a graph constituting essentially a continuous line representing the correlation results.

The scanning actions of both memory devices are controlled by timing pulses generated continuously at predetermined intervals (say one every 9 microseconds) by a timing pulse generator $T_p$. These timing pulses are applied through a normally open gate $G_1$ to selectors S of both memory devices $D_1$ and $D_2$. Thus when the timing pulses are applied, the devices simultaneously step from memory location to memory location, the arrangement being such that the scanning action circulates and, if uninterrupted, depending on which location is first, it will run through all succeeding locations and return to the first. If, for example, scanning in $D_1$ commences at memory $M_3$, the selective system will step from $M_3$ to $M_{100}$, and from $M_{100}$ to $M_1$ and $M_2$, and again at $M_3$ it will repeat the same scanning cycle.

The operation of the system is cyclical, a new cycle being initiated after the one hundred memory locations in memory device $D_2$ have been read out. To initiate a new cycle of operations, a control pulse is derived from the read-out circuit of memory device $D_2$ by means of a control signal circuit $C_p$ which may, for example, take the form of a counter coupled to the read-out $R_0$ of device $D_2$ to produce a control signal after 100 locations are counted. Control signal circuit $C_p$ is coupled in a manner to be described to eraser E, selector S in device $D_1$, gate $G_1$ and gate $G_2$.

In order to explain the cyclical operation of the system we shall first assume that pulse counts have been entered in each of memory locations $M_1$ to $M_{100}$ in device $D_1$ and also in device $D_2$ and that as a result, a control signal is produced in the output of control circuit $C_p$. Thus, at this point, the selectors of both $D_1$ and $D_2$ are at the $M_{100}$ location. It must also be borne in mind that gate $G_2$ is at this moment closed and no input pulses representing signal $f_1$ are being fed into selector S of device $D_1$. Gate $G_1$ however is open and therefore the next timing pulse from generator $T_g$, unless gate $G_1$ is immediately closed, will cause the selectors to advance one step. We shall now consider the actions produced by the control signal.

*Action 1.*—A control signal from circuit $C_p$ is first applied to gate $G_1$ to block the entry of timing pulses to selectors S in both devices $D_1$ and $D_2$, and at the same time the control signal is applied to selector S of device $D_1$, thereby advancing this selector a single step which in the example given is from $M_{100}$ to $M_1$.

*Action 2.*—A control signal from circuit $C_p$ is then applied to eraser E in device $D_1$ to erase the count in the selected location ($M_1$), and clear this location for a new entry.

*Action 3.*—A control pulse is then applied to gate $G_2$ to open the gate and admit pulses therein from pulse modulator $P_1$.

*Action 4.*—A control pulse is applied both to gates $G_1$ and $G_2$ to reopen gate $G_1$ and simultaneously close gate $G_2$.

Thus with action 4, which takes place after a new count has been entered into the next location, gate $G_2$ is again closed to cut off the further admission of pulses, while gate $G_1$ is open to provide timing pulses causing both devices $D_1$ and $D_2$ to scan 100 locations, until the next control signal is generated, at which point the cycle is repeated.

It is important to note that, with each new cycle, the selector S in device $D_1$ is caused to advance one location, whereas selector S in device $D_2$ remains at the same initial location. In other words: in cycle one, after the count entry has been made in memory $M_1$ in device $D_1$, scanning will begin at $M_2$ and terminate at $M_1$; in cycle two, after the count entry has been made in memory $M_2$ in device $D_1$, scanning will begin at $M_3$ and terminate at $M_2$, and so on with successive cycles. But with device $D_2$, scanning will, for each cycle, begin at the same point, without any prior initial advance.

With successive cycles of operation, the pulses representing $f_1$ are entered into the one hundred memory locations and in the read-out of device $M_1$, one hundred ordinates, each representing the analog of the count, are produced. Scanning may be at a rate of 90 microseconds per address and therefore takes 9 milliseconds to traverse all one hundred locations.

The analog values successively read out from device $D_1$ are applied to multiplier $A_m$ in combination with wave $f_2$ which is continuously fed as an input thereto. The output of the multiplier is thus a 100 points product and this is fed to modulator $P_2$. The data pulses from modulator $P_2$ are fed to memory device $D_2$ such that the counts therein are proportional to the product of analog $f_1$ and wave $f_2$ at 100 locations, each corresponding to a particular value of $\tau$. The counts in $D_2$ when read out and recorded produce 100 ordinates, and these appear on the chart shown in FIG. 4 as closely spaced points which constitute the correlation curve.

Thus to summarize the cyclical operation, with each new cycle, pulses whose rate represents the first wave $f_1$ are entered into selected memory location in a circular series thereof and counted therein, the previous count in said location being first erased. Beginning with the next memory location in the series, the locations in the series are successively scanned to produce a like number of analog values representing the respective counts. With the succeeding cycles the location selected is the next in line, and the count therein is first erased and the pulses entered therein, the scanning operation then being repeated. Thus the analog values of the first wave yielded during each cycle represent a particular value of $\tau$.

These analog values of the first wave are then multiplied with the second wave to produce a product which is converted into pulses whose rate is representative thereof, which data pulses are applied to a like number of memory locations in a second series thereof, which locations are scanning concurrently with those in the first series to produce analog values representing the correlation function.

With regard to the multiplier, this circuit may be extremely simple since only single quadrant multiplication is necessary. As shown in FIG. 3, the multiplier may consist of a transistor 10 wherein signal $f_2$ is applied continuously at terminal 11 to the base. The read-out pulses from memory $M_1$ representing signal $f_1$ are applied to the collector through a resistor 12, the emitter being grounded or suitably biased. The combined 100 products analog is derived from the collector directly at terminal 13.

The output of the multiplier is mathematically not $ef_1f_2$ but $(f_1+A)(f_2+B)$.

The existence of a cross or autocorrelation function $$\phi(\tau) = \int_0^T f_1(t) f_2(t+\tau) dt$$

implies that $$\int_0^T f_2(t) dt = 0$$

that is to say that $f_1$ and $f_2$ both have mean values of zero taken over an appreciable time T. In practice this is often ensured by capacitive coupling at the input of a suitable time constant or it may be implicit in the amplification.

While there has been shown what at present are considered preferred embodiments of the invention it is to be understood that many changes and modifications may be made therein without departing from the spirit of the invention and it is intended in the annexed claims to cover all such changes as fall within the true scope of the invention.

What is claimed is:

1. Apparatus for continuously determining the correlation function between two waves of varying amplitude comprising means converting the first wave into pulses having a repetition rate which depends on the instantaneous amplitude thereof, means cyclically entering said pulses into a selected one of a circular series of memory locations to obtain a count thereof after first erasing the previous count entered therein, means scanning said series of locations during each cycle beginning at the locations following the then selected location to produce a series of analog values corresponding to the counts in said location, the pulses during succeeding cycles being entered into successively selected locations in said series, means multiplying said analog values with said second wave to produce a product thereof, and means deriving from said product a series of analog values representative of the correlation function.

2. Apparatus for continuously determining the correlation function between two waves of varying amplitude comprising means converting the first wave into pulses having a repetition rate which depends on the instantaneous amplitude thereof, means cyclically entering said pulses into a selected one of a circular series of memory locations to obtain a count thereof after first erasing the previous count entered therein, means scanning said series of locations during each cycle beginning at the location following the then selected location to produce a series of analog values corresponding to the counts in said location, the pulses during succeeding cycles being entered into successively selected locations in said series, means multiplying said analog values with said second wave to produce a product thereof, means converting said product into a data pulse train and for entering the pulses in said train in synchronism with the scanning action into successive locations of a second series of memory locations to obtain the count thereof, and means scanning said second series to obtain an output series of analog values representative of the correlation function.

3. Apparatus as set forth in claim 2, further including means to record said output series of analog values to provide a graphical representation thereof.

4. A system for continuously determining the correlation function between two waves of varying amplitude, comprising means to convert the first wave into pulses having a repetition rate depending on the instantaneous amplitude thereof, first and second memory devices each including a circular series of memory locations and selector means and scanning means operatively coupled to said locations, means cyclically entering said pulses into a selected one of the locations in the first device to obtain the count thereof after first erasing the previous count entered therein, means scanning said series of locations in said first device during each cycle beginning at the location following the then selected location to produce a series of analog values corresponding to the counts in said location, the pulses during succeeding cycles being entered into successively selected locations in said series, a multiplier, means applying said analog values and said second wave into said multiplier to produce a product thereof, means coupled to said multiplier to convert said product into a data pulse train, means entering the pulses in said train in synchronism with the scanning action of said first device into successive locations in said second memory device to obtain the count thereof and means to scan the locations in said second device to obtain an output series of analog values representative of the correlation function.

5. A system for continuously determining the correlation function between two waves of varying amplitude, comprising a first pulse modulator for converting the first wave into pulses having a repetition rate depending on the instantaneous amplitude thereof, first and second memory devices each having a circular series of memory locations and selector means and scanning means therefor, means cyclically entering said pulses into a selected one of the locations in the first device to obtain a count thereof after first erasing the previous count entered therein, means in said first device for scanning said series of locations during each cycle beginning at the location following the then selected location to produce a series of analog values corresponding to the counts in said location, the pulses during succeeding cycles being entered into successively selected locations in said series, a multiplier, means applying said analog values and said second wave into said multiplier to produce a product thereof, a second pulse modulator coupled to said multiplier to convert said product into a data pulse train, means entering the pulses in said train in synchronism with the scanning action into successive locations in said second memory device to obtain the count thereof, means to scan the locations in said second device to obtain an output series of analog values representative of the correlation function and means to record said output values to produce a curve.

References Cited in the file of this patent

Cheatham: "Electronic Correlator for Solving Complex Signalling Parameters," Tele-Tech, February 1950, pp. 40 to 43.

Singleton: "A Digital Electronic Correlator," Proc. of the IRE, December 1950, pp. 1422 to 1428.